Patented June 24, 1930

1,768,257

UNITED STATES PATENT OFFICE

HANS JORDAN, OF BERLIN-STEGLITZ, GERMANY, ASSIGNOR TO THE FIRM: CHEMISCHE FABRIK AUF ACTIEN VORM. E. SCHERING, OF BERLIN, GERMANY

METHOD OF PRODUCING THYMOL

No Drawing. Application filed August 15, 1927, Serial No. 213,201, and in Germany August 16, 1926.

My invention refers to the production of thymol and its isomers and homologues from the products obtained by condensation of alkyl phenols and ketones at low temperature in the presence of a condensing agent such as for instance hydrochloric acid, as described in my copending application for patent of the United States Serial No. 200,289. In another application Serial No. 200,290 I have disclosed how these condensation products are decomposed into alkyl isopropylene phenols and alkylized cumaranes by heating to about 300° C. In a third application filed jointly with Walter Schoeller, Serial No. 200,297, the obtention of thymol and its isomers and homologues by treating these products of decomposition with hydrogen in the presence of a catalyst, until two hydrogen atoms have entered into combination, is disclosed.

I have now found that I can produce thymol and its isomers and homologues direct from the condensation products mentioned above, without thermic decomposition thereof, by treating them at elevated temperature with hydrogen in the presence of one of the well known hydrogenation catalysts, until 4 hydrogen atoms have been introduced.

I have found it preferable to add, besides the ordinary hydrogenation catalyst spoken of, another hydrogenation catalyst capable of reducing the temperature, at which thermic decomposition occurs, thus allowing operating at the most favorable hydrogenation temperature. I have found such catalysts to be for instance the metal phenolates, for instance aluminium or magnesium phenolate, or metal compounds capable of forming phenolates, such as the oxids and other compounds of aluminium, magnesium and mercury.

In practising my invention I may for instance treat the condensation product of an alkyl phenol, such as m-cresol, and a ketone, such as acetone, in the presence of about 0.1 per cent of the aluminium compound of the unsaturated phenol to be produced and about 1 percent of a nickel catalyst in an autoclave at 180–190° C. with hydrogen, until four atoms hydrogen have been combined. I have found that the products of decomposition formed at the reaction temperature under the influence of the aluminium catalyst are hydrogenated with extreme readiness. From the reaction product thymol and its isomers and homologues can be separated out in a well known manner.

As described in Sabatier, Die Katalyse in der organischen Chemie (Leipzig 1927), page 386, the nickel catalyst is obtained by precipitating in a nickel salt solution the carbonate or hydroxide and rinsing, drying and grinding same as finely as possible.

Example 1

The product of condensation of m-cresol and acetone obtained by condensing at low temperature in the presence of gaseous hydrochloric acid is treated in the presence of 0.1 per cent aluminium-3-methyl-6-isopropylene phenolate and 1 per cent of a nickel catalyst with hydrogen, under pressure, if desired, until 4 atoms of hydrogen have entered into combination. From the product obtained in the reaction thymol can be separated in a well known manner.

Example 2

The condensation product of p-cresol and acetone is treated at 180–190° C. with hydrogen in the presence of 0.1 per cent aluminium-4-methyl-6-isopropylene phenolate and 1 per cent of a nickel catalyst, until 4 hydrogen atoms have been combined. There results 4-methyl-6-isopropylene phenol.

Various changes may be made in the details disclosed in the foregoing specification without departing from the invention or sacrificing the advantages thereof.

In the claims the term "phenolate body" is intended to include metal phenolates such as aluminium or magnesium or mercury phenolates or compounds of these metals, such as the oxides, which under the conditions prevailing during the reaction, can be converted into phenolates.

I claim:—

1. The process of producing thymol and its isomers and homologues comprising treating a product of condensation produced in the presence of an acidic condensing agent of an alkyl phenol and an aliphatic ketone at elevated temperature in the presence of a hydrogenation catalyst and a phenolate body with hydrogen, until four hydrogen atoms have entered into combination.

2. The process of producing thymol and its isomers and homologues comprising treating a product of condensation produced in the presence of an acidic condensing agent of a cresol and acetone at elevated temperature in the presence of a hydrogenation catalyst and a phenolate body with hydrogen until four hydrogen atoms have entered into combination.

3. The process of producing thymol and its isomers and homologues comprising treating a product of condensation produced in the presence of an acidic condensing agent of an alkyl phenol and an aliphatic ketone at elevated temperature in the presence of a hydrogenation catalyst and a metal phenolate with hydrogen, until four hydrogen atoms have entered into combination.

4. The process of producing thymol and its isomers and homologues comprising treating a product of condensation produced in the presence of an acidic condensing agent of an alkyl phenol and an aliphatic ketone at elevated temperature in the presence of a hydrogenation catalyst and a metal phenolate of the unsaturated phenol to be produced with hydrogen, until four hydrogen atoms have entered into combination.

5. The process of producing thymol and its isomers and homologues comprising treating a product of condensation produced in the presence of an acidic condensing agent of an alkyl phenol and an aliphatic ketone at elevated temperature in the presence of an ordinary nickel catalyst and a metal phenolate with hydrogen, until four hydrogen atoms have entered into combination.

6. The process of producing thymol and its isomers and homologues comprising treating a product of condensation produced in the presence of an acidic condensing agent of an alkyl phenol and an aliphatic ketone at elevated temperature in the presence of an ordinary nickel catalyst and a metal phenolate of the unsaturated phenol to be produced with hydrogen, until four hydrogen atoms have entered into combination.

7. The process of producing thymol and its isomers and homologues comprising treating the condensation product produced in the presence of an acidic condensing agent of m-cresol and acetone at about 180–190° C. in the presence of about 0.1 per cent iluminium-3-methyl-6-isopropylene phenolate and about 1 per cent of a nickel catalyst with hydrogen, until 4 hydrogen atoms have entered into combination, and separating out thymol.

In testimony whereof I affix my signature.

HANS JORDAN.